Patented Oct. 6, 1936

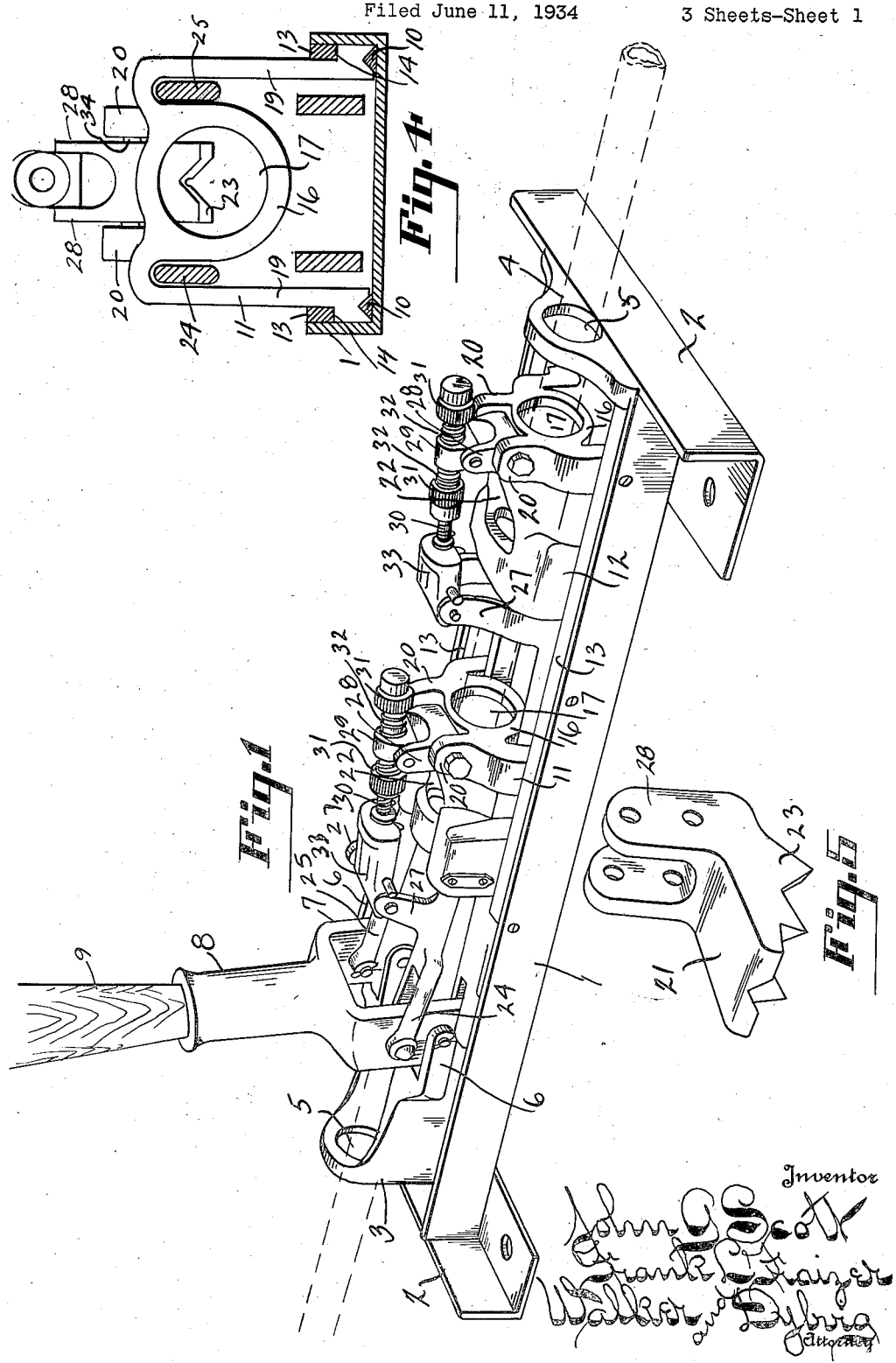

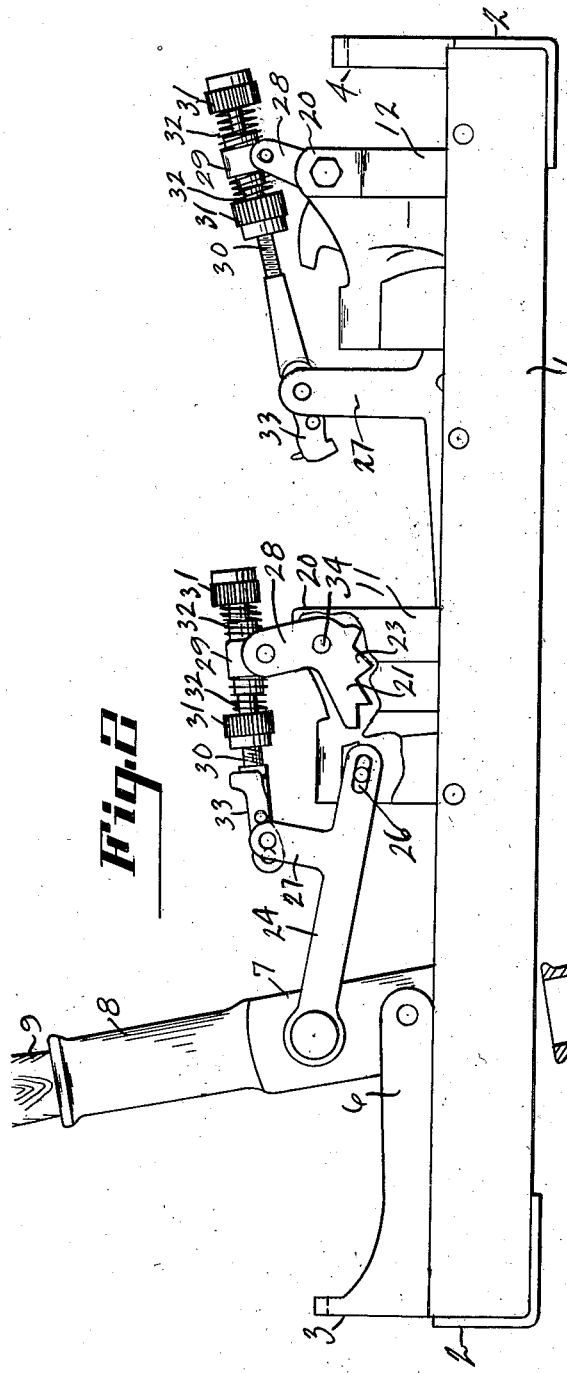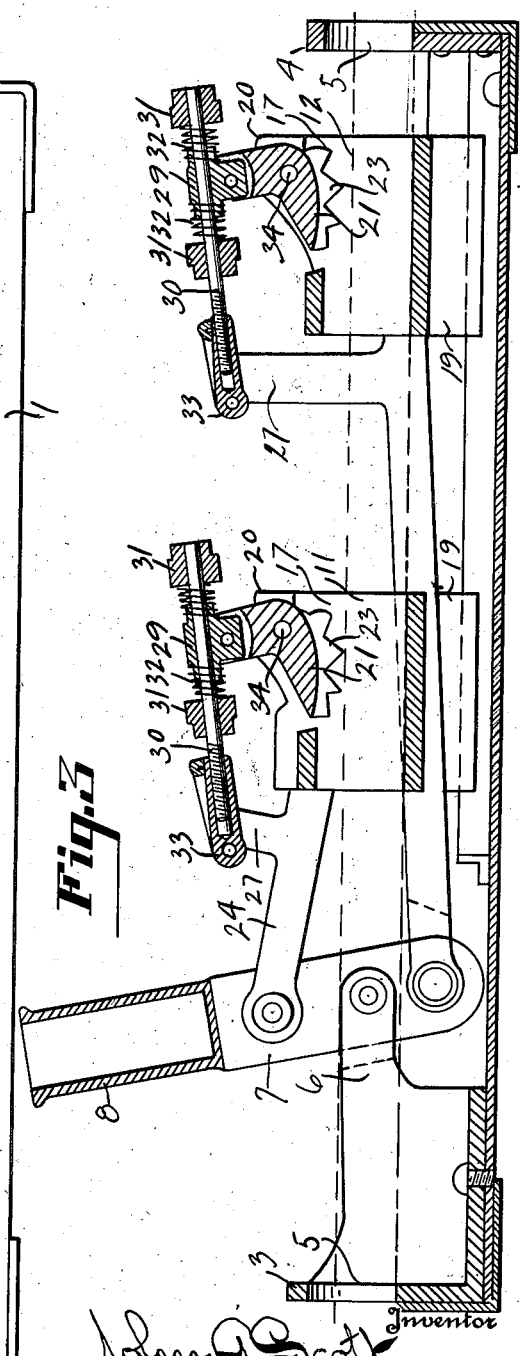

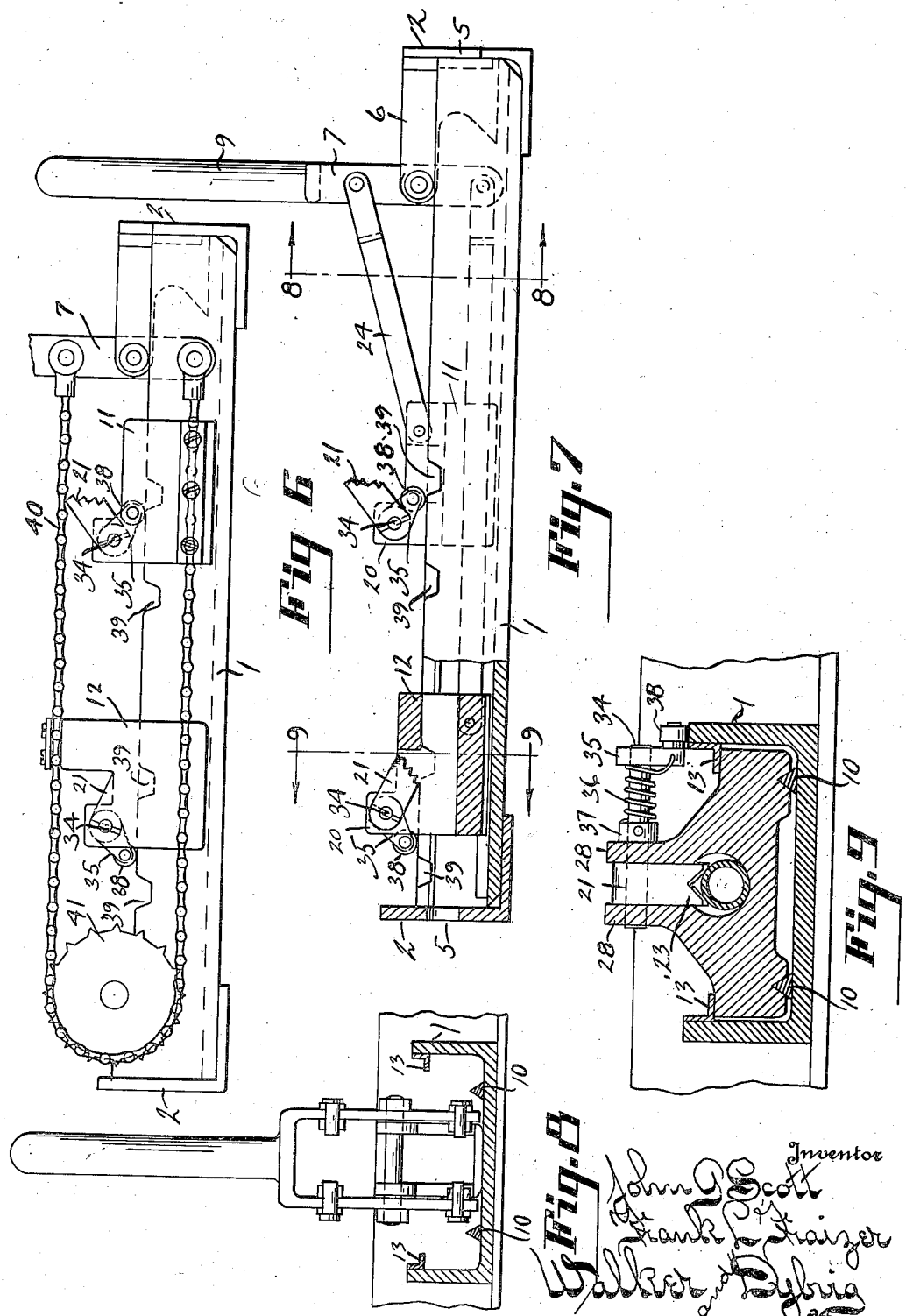

2,056,489

UNITED STATES PATENT OFFICE 2,056,489

PIPE PULLER AND PUSHER

John G. Scott and Frank L. Fraizer, Troy, Ohio

Application June 11, 1934, Serial No. 730,038

20 Claims. (Cl. 254—29)

This invention relates to pipe pulling and installing apparatus for retrieving underground pipes and conduits, such as water and gas pipes and for replacing such withdrawn pipes or conduits with new material drawn into place as the old material is withdrawn, and for driving pipes under ground by thrust action.

The present apparatus is especially useful for installation and replacement of water and gas service pipes from supply mains in the streets into residences. The installation and replacement of such conduits is not only difficult and expensive, but is highly objectionable due to the necessity of excavating streets and lawns. The present apparatus enables such pipes to be initially installed and if necessary replaced without the necessity of excavating more than a mere hole at one or both ends of the pipe line. While the apparatus is especially desirable for installing and removing or replacing house service lines, it is also applicable generally to installing and retrieving pipe conduits in other localities and of various sizes, and is practical for operation upon quite extensive lengths of such conduits.

The object of the invention is to simplify the construction as well as the means and mode of operation of pipe pulling and installing devices whereby they will not only be cheapened in construction, but will be more efficient in use, of great strength and powerful in operation, uniform in pulling action, and unlikely to get out of repair.

A further object of the invention is to provide an apparatus which exerts a direct power influence in line with the pipe being operated upon, and which may be operated rapidly and conveniently.

A further object of the invention is to provide an apparatus which, after having been operated to withdraw or to drive a given length of pipe, may be readily and quickly disengaged and reengaged therewith for each succeeding operative movement.

A further object of this invention is to provide an apparatus which may be operated rapidly and conveniently, and quickly changed from a pushing to a pulling operation, and vice versa.

A further object of the invention is to provide pipe gripping means which will automatically engage the pipe under all conditions and is quickly released and reset.

A further object of the invention is to provide a double acting apparatus wherein lost motion will be minimized and the pushing or pulling operation rapidly repeated with each alternation of the actuating means.

A further object of the invention is to provide such an apparatus having but few parts, of compact form, and of maximum strength.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings, wherein is shown the preferred but obviously not necessarily the only form of embodiment of the invention, Fig. 1 is a perspective view of the assembled apparatus. Fig. 2 is a side elevation thereof, partly broken away. Fig. 3 is a longitudinal sectional view. Fig. 4 is a transverse sectional view. Fig. 5 is a detail perspective view of one of the pipe engaging members. Fig. 6 is a side elevation of a modification wherein a flexible chain or cable is employed for transmitting motion from the actuating lever to the pipe engaging devices. Fig. 7 illustrates further a modification of the pipe pulling and pushing device. Fig. 8 is a sectional view taken on line 8—8 of Fig. 7. Fig. 9 is a sectional view substantially on line 9—9 of Fig. 7.

Like parts are indicated by similar characters of reference throughout the several views.

The main frame of the apparatus preferably, though not necessarily, comprises a length of structural steel channel 1 disposed with its recessed side upward and provided at each end with transverse cross arms 2—2 preferably of structural angle bars which extend laterally beyond the sides of the longitudinally disposed channel portion 1 and serve as outrigger arms to prevent lateral tilting of the frame. Located interiorly of the frame structure at each end thereof are guide heads 3 and 4 projecting above the level of the sides of the channel 1 and cross arms 2 and having therein openings 5 through which the pipe to be operated upon may extend. The guide head 3 is provided with parallel spaced arms 6 in which is pivoted for to and fro oscillatory motion an actuating lever 7 which, as shown in the drawings, is provided with a socket portion 8 to receive a handle extension 9.

Mounted upon longitudinally disposed guides or ways 10 within the frame channel 1 are two reciprocatory carriers 11 and 12. Retaining strips 13 are provided interiorly of the side flanges of the frame channel 1 to which they are fixedly secured by welding, riveting or otherwise. These retainer strips 13 overhang shoulders or offsets 14 on opposite sides of the sliding members 11 and 12 to hold such members upon the guides or ways 10 and assist in guiding them in their to and fro movement.

The slide members 11 and 12 include substantially cylindrical medial portions 16 having central openings 17 therethrough aligned with the openings 5 in the guide heads 3 and 4 so that the pipe to be operated upon may extend through such central openings 17 of the slide members and the openings 5 of the guide heads at each end of the main frame. Such medial portion 16 is supported by vertical lateral legs 19 which, at their lower ends, have sliding bearing upon the guides or ways 10 and beneath the retaining strips 13 as before described.

Pivotally mounted between upstanding spaced lugs or ears 20, projecting from the top of each of the slide members 11 and 12, is a substantially L-shaped gripper jaw 21 operative through an opening 22 in the top of the slide member into clutching engagement with the pipe to be operated upon which extends axially through the holes 5 in the guide heads 3 and 4 and through the opening 17 of the respective slide members. The gripper jaws 21 have an angular or V-shaped indentation in their under sides extending longitudinally of the pipe section to be engaged and are further transversely indented at opposite sides of such longitudinal indentations to afford a succession of relatively sharp shoulders or teeth for engagement with the pipe. These sharpened shoulders or teeth 23 are located different radial distances from the center of oscillation of the gripper jaws 21 so that different teeth or sharpened shoulders will operatively engage with pipes of different diameters.

The respective sliding heads 11 and 12 are interconnected with the actuating lever 7 but on opposite sides of the pivotal connection thereof by means of reciprocatory links 24 and 25 which extend interiorly of the lateral vertical legs 19 of the respective slide members and have slotted connections 26 with the respective slide members. Due to the slot and pin connection 26 of the operating links 24 and 25 with the respective slide members, the actuator and connecting links are capable of limited movement first in one direction and then in the other independently of the respective slide members which in turn are actuated in reverse directions by further swinging movement of the actuating lever 7. This preliminary independent movement of the actuating lever and connecting links is utilized for setting one of the gripper jaws 21 into firm operative engagement with the pipe operated upon while the engaging gripper jaw of the other sliding member is automatically disengaged therefrom by such preliminary independent movement in advance of the operative movement of the slide members.

To this end, each of the operating links 24 and 25 is provided with an upstanding arm 27 interconnected with the parallel upstanding arms 28 of the corresponding gripper jaw 21. Pivotally connected between the arms 28 of the gripper jaw 21 is a collar 29 slidingly mounted upon a rod 30 intermediate relatively adjustable abutment collars 31 screw-threaded upon the rod 30 at opposite sides of the sliding collar 29. Helical springs 32 are interposed between the collar 29 and the respective adjustable abutment collars 31. The rod 30 is in turn eccentrically connected with a lever 33 pivoted to the upstanding arms 27 of the links connecting the slide with the actuating lever 7. The lever 33 with the rod 30 forms a connection capable of being thrown slightly beyond one position to retract the rod 30 and upon its reversal adapted to extend the rod and with it the respective collars 29 and 31. In its normal position, as shown at the right in Figs. 1, 2 and 3, upon initial movement of the lever 7, the operating link 24 will be retracted to exert pulling influence upon the rod 30 and yieldingly force the gripper jaw 21 into engagement with the pipe to be operated upon by compressive action upon one of the springs 32. After the gripper jaw has firmly engaged the pipe, any further preliminary movement of the actuator lever 7 occurs against the tension of the spring 32, thereby increasing the tension upon the gripper jaw until the lost motion is taken up in the slotted connection 26 whereupon by further movement of the actuating lever 7 the slide member will be retracted, carrying with it the length of pipe engaged by the gripper jaw 21. By the same oscillatory movement of the actuating lever transmitted through the second pair of operating links 25, the sliding head 12 will be actuated through a retrograde movement preparatory to reengagement with the pipe. However, the initial movement of the lever and link 25 permitted by the slotted connection 26 will exert pressure against the sliding collar 29 through the other of the tension springs 32 to thereby tilt the gripper jaw 21 out of its engagement with the pipe in advance of the movement of the slide member 12. Upon return oscillation of the actuating lever 7, the sequence of operation will be reversed and by pulling tension being applied to the operating link 25, the gripper jaw pertaining to the sliding member 12 will be oscillated into operative engagement with the pipe, and the spring 32 tensioned to increase such engaging pressure, and as the actuating lever 7 and link 25 continue to move the sliding member 12 will be retracted to carry with it the engaged pipe, while at the same time the pushing influence exerted upon the link 24 by the oscillating lever 7 will serve to initially disengage the gripper jaw 21 and by continued movement transmits retrograde motion to the sliding member 11. Thus the members 11 and 12 are actuated alternately, one serving to advance the pipe section while the other is being retracted into position for reengagement therewith, the initial movement of the actuating lever 7 in either direction serving to disengage one of the gripper jaws and reengage the other under increasing spring tension prior to movement of the respective sliding members 11 and 12.

When, however, it is desirable to retract the gripper jaws 21 to facilitate the insertion of a length of pipe to be operated upon, the levers 33 are reversed and due to their eccentric pivotal interconnection with the arms 27 of the operating links and the rod 30, the latter will be longitudinally shifted independently of the movement of the actuating lever 7 to oscillate the gripper jaws out of engagement with the pipe and out of the path of the pipe within the portions 16 of the sliding members. Such reversal of the adjusting levers 33 serves to extend or lengthen the rods 30 sufficiently to tilt the gripper jaws to inoperative position.

The pipe length being inserted through the openings 5 in the guide heads 3 and 4 and through the openings 17 in the medial portions 16 of the sliding members, the adjusting levers 33 are returned to their normal overlapping relation with the rod 30 which, due to the eccentric connection, are thereby retracted or shortened to return the gripper jaws 21 to operative relation with the pipe.

In the modification disclosed in Figs. 7 to 9 inclusive the frame is substantially as before described and comprises the structural channel beam 1 provided with transverse angle arms 2 at each end, either of which may be employed to abut a wall of an excavation to afford the necessary resistance for pulling or pushing the pipe in the same manner as with the construction before described. The guide head 3 at one end of the structure is provided with parallel arms 6, as before described, to which is pivoted the actuating lever 7 to which are connected at opposite sides of the center of oscillation the operating links 24 and 25. The operating links 24 and 25 are connected respectively with slide members 11 and 12 mounted for reciprocation upon guides or ways 10 in the bottom of the frame channel 1 to which they are held by overhanging flanged retaining bars 13'. The construction is such that as the actuating lever 7 is oscillated to and fro, the sliding members 11 and 12 will be reciprocated in alternating directions. As thus far described, this construction is substantially the same as that illustrated in the preceding Figures 1 to 6 inclusive.

Pivotally mounted in each of the sliding members 11 and 12 is an oscillatory gripper jaw 21 mounted in ears or lugs 20 projecting upwardly from the sliding members 11 and 12. The gripper jaws 21 of the construction shown in Figs. 7 and 8 are carried upon laterally extending rock shafts 34 which, at their outer ends, carry rock arms 35 loosely journalled upon the rock shaft 34 but yieldingly coupled therewith for differential movement by the helical spring 36 coiled about the rock shaft 34 having one end thereof connected with the rock arm 35 and the other end either connected directly to the rock shaft 34 or connected to a collar 37 fixedly engageable with the rock shaft 34 in different positions of rotary adjustment in order to vary the tension of the spring and to enable the gripper jaw to be set relative to the rock arm 35 and tension spring 36 to accommodate pipes of different diameters.

The rock arm 35 carries a roller 38 which rides upon the top edge of the upturned side flange of the frame channel 1. This channel is notched or indented at 39 substantially coincident with the limit of the range of movement of the respective sliding members 11 and 12, into which notches the roller 38 of the arm 35 descends as the corresponding sliding member reaches the limit of its movement in either direction. The arm 35 is of such length that it cannot reverse its position except when the roller 38 descends into one or the other of the notches 39. The arm 35 assumes a trailing position during the movement of the sliding member, which position is reversed with each alternation of the sliding member.

During the initial movement of the sliding member in its operative stroke, the roller 38 riding up the inclined side of the notch 39 tends to oscillate the rock arm 35 and thereby tension the spring 36 to force the gripper jaw 21 into operative engagement with the pipe section and to so hold it under the tension of the spring 36 during the remainder of the operative stroke of the sliding member. As the sliding member reaches the limit of its operative movement, the roller 38 will descend into the other of the notches 39, pertaining to such sliding member, and upon the initial return movement of the sliding member the arm 35 will be reversed to an opposite trailing position thereby transmitting a partial rotation to the rock shaft 34 through the spring 36 to raise the gripper jaw 21 out of engagement with the pipe section to an inoperative elevated position during the retrograde stroke. Thus the sliding heads are actuated alternately through their operative and inoperative movement, the initial movement of the sliding head, in its operative stroke, serving to oscillate the gripper jaw into engagement with the pipe and tension the pressure spring 36 while the initial retractive movement serves to disengage the gripper jaw.

It will be understood that the invention may be embodied in various variations and modifications of the construction illustrated as for example in lieu of rigid operating links 24 and 25 for transmitting reciprocatory motion to the alternating slide members 11 and 12, such members may be connected with the actuating lever 7 by a flexible cable or chain as illustrated in Fig. 6, wherein the chain 40 has its opposite ends connected to the actuating lever 7 at opposite sides of the center of oscillation thereof, while medially such chain passes about a sprocket wheel or sheave 41. There are preferably two of such chains arranged in parallel relation at opposite sides of the alternating slide members 11 and 12 to which the respective reaches of the chain are connected, one sliding member being connected to the lower run and the other to the upper run of the chain.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a pipe manipulating machine of the character described, a main frame including guide ways, a reciprocating carriage slidable on the guide ways, a pipe engaging gripper carried thereby, spring means including a spring for retracting the gripper out of engagement with the pipe and another spring for advancing the gripper into engagement with the pipe, and motive means for the carriage adapted to actuate the gripper against the tension of one of said springs into engagement with the pipe and upon further operation to move the carriage.

2. In a unidirectional pipe manipulating machine, a main frame, a reciprocatory carriage mounted for to and fro motion thereon, a pipe engaging gripper carried by the carriage, lost motion motive means for the carriage, said lost motion means terminating in a positive drive and a spring placed under tension by the motive means for urging the gripper into engagement with the pipe in advance of the movement of the carriage.

3. In a unidirectional pipe manipulating machine, a main frame, a reciprocatory carriage mounted for to and fro motion thereon, a pipe engaging gripper carried by the carriage, lost motion motive means for the carriage, said lost motion means terminating in a positive drive and a yielding connection between the motive means and the gripper for urging the gripper into engagement with the pipe in advance of the movement of the carriage.

4. In a pipe manipulating machine, a main frame, a reciprocatory carriage mounted for to and fro motion thereon, a pipe engaging gripper carried by the carriage, motive means for the carriage, and an operative connection between the motive means and the gripper by which the gripper is automatically retracted out of engagement with the pipe during retrograde motion of the carriage and automatically reengaged therewith in advance of the effective motion of the carriage.

5. In a pipe actuating mechanism, a pair of reciprocatory carriers, an actuator for simultaneously moving the carriers in alternating directions, a gripper jaw carried by each reciprocatory carrier, and alternately engageable with the pipe operated upon and control means for the gripper jaws by which upon the initial movement of the actuator in each direction one of the gripper jaws will be actuated into operative engagement with the pipe operated upon while the other jaw is actuated out of engagement therewith.

6. In a pipe actuating apparatus, a pair of reciprocatory carriers, actuating means for simultaneously moving the carriers in alternating directions, a gripper jaw carried by each carrier for engagement with the pipe operated upon, a tension spring for each gripper jaw, and means for tensioning the spring pertaining to one jaw to force said jaw into engagement with the pipe upon initial operation of the actuator, and means for simultaneously effecting the movement of the other jaw to inoperative position relative to the pipe.

7. In a pipe actuating apparatus, a main frame, a pair of reciprocatory carriers mounted thereon, actuating means for transmitting thereto simultaneous reciprocatory motion in alternating directions, gripper jaws carried by the respective carriers and alternately operatively engageable with the pipe operated upon, and means for bodily moving the gripper jaws toward and from engaging relation with the pipe in accordance with the direction of movement of the respective carriers.

8. In a pipe actuating apparatus, a main frame, a pair of reciprocatory carriers mounted thereon, actuating means for transmitting thereto simultaneous reciprocatory motion in alternating directions, gripper jaws carried by the respective carriers and alternately operatively engageable with the pipe operated upon, a reciprocatory control rod, an interconnection between the control rod and the actuating means by which the rod is actuated thereby independently of and in advance of the movement of the carriers, springs tensioned by the movement of the control rod first in one direction and then in the other, and a connection for the gripper jaws interposed between the springs and subject to the yielding resistance thereof in first one direction and then in the other to actuate the gripper jaws alternately into and out of engagement with the pipe.

9. In a pipe actuating apparatus, a main frame, a pair of reciprocatory carriers mounted thereon, actuating means for transmitting thereto simultaneous reciprocatory motion in alternating directions, gripper jaws carried by the respective carriers and alternately operatively engageable with the pipe operated upon, jaw operating mechanism operatively connected with the actuating means and operated by the initial movement thereof to shift the jaws alternately into and out of engagement with the pipe independently of and in advance of the movement of the carriers.

10. In a pipe actuating apparatus, a main frame, a pair of reciprocatory carriers mounted thereon, actuating means for transmitting thereto simultaneous reciprocatory motion in alternating directions, gripper jaws carried by the respective carriers and alternately operatively engageable with the pipe operated upon, jaw operating means operatively connected with the actuating means including a spring for each jaw, said springs being tensioned alternately to yieldingly urge the corresponding jaw into engagement with the pipe by the initial movement of the actuating means independently of and in advance of the movement of the carriers.

11. In a pipe actuating apparatus, a main frame, a pair of reciprocatory carriers mounted thereon, actuating means for transmitting thereto simultaneous reciprocatory motion in alternating directions, gripper jaws carried by the respective carriers and alternately operatively engageable with the pipe operated upon, jaw operating means operatively connected with the actuating means including a spring for each jaw, said springs being tensioned alternately to yieldingly urge the corresponding jaw out of engagement with the pipe by the initial movement of the actuating means independently of and in advance of the movement of the carriers.

12. In a pipe actuating apparatus, a main frame, a pair of reciprocatory carriers mounted thereon, actuating means for transmitting thereto simultaneous reciprocatory motion in alternating directions, gripper jaws carried by the respective carriers and alternately operatively engageable with the pipe operated upon, and jaw operating mechanism operatively connected with the actuating means including extensible and contractible means operated by the initial movement of the actuating means to shift the jaws into and out of engagement with the pipe preparatory to movement of the carrier, and means for extending and contracting the said second means to shift the jaws into and out of engagement with the pipe independently of the movement of the carrier.

13. In a pipe actuating apparatus, a main frame, a pair of reciprocatory carriers mounted thereon, actuating means for transmitting thereto simultaneous reciprocatory motion in alternating directions, gripper jaws carried by the respective carriers and alternately operatively engageable with the pipe operated upon, jaw operating mechanism operatively connected with the actuating means for shifting the jaws into and out of engagement with the pipe operated upon by the initial movement of the actuating means, and means for shifting the jaws into and out of engaging relation with the pipe independently of the carrier.

14. In a pipe actuating apparatus, a reciprocatory carrier, actuating means for reciprocating the carrier, a gripper jaw carried thereby, a lost motion connection between the actuating means and the carrier, and a connection between the actuating means and the jaw by which the jaw is shifted into and out of engaging relation with the pipe by the initial operation of the actuating means independently of and in advance of the movement of the carrier, the further movement of the actuating means serving to move the carrier and jaw in unison with the jaw in the position to which it has been shifted by said initial movement.

15. In a pipe actuating apparatus, a reciprocatory carrier, actuating means for reciprocating the carrier, a gripper jaw carried thereby, a lost motion connection between the actuating means and the carrier, and means for actuating the jaw alternately into and out of engaging relation with the pipe by utilization of said lost motion between the actuator and carrier.

16. In a pipe actuating apparatus, a main frame, a reciprocatory carrier mounted thereon, an actuator for reciprocating the carrier, a pipe engaging gripper jaw carried by the carrier and movable into and out of engaging relation with the pipe, and a toggle link connection between the gripper jaw and the actuator for transmitting movement from the actuator to the jaw and adapted by adjustment of said toggle link to adjust said jaw into and out of engaging relation with the pipe independently of the reciprocation of the carrier.

17. In a pipe actuating apparatus, a main frame, a reciprocatory carrier mounted thereon, an actuator for reciprocating the carrier, a pipe engaging gripper jaw carried by the carrier and movable into and out of engaging relation with the pipe, and extensible and contractible means connecting the actuator with the jaw for operation of the jaw into and out of engaging relation with the pipe by operation of the actuator and adapted by extension and contraction of said means to operate the jaw into and out of engaging relation with the pipe independently of the reciprocation of the carrier.

18. In a pipe actuating apparatus, a main frame, a reciprocatory carrier mounted thereon, an actuator for reciprocating the carrier, a pipe engaging gripper jaw carried by the carrier and movable into and out of engaging relation with the pipe, and a yielding connection between the actuator and the movable jaw placed under tension to urge the jaw into engaging relation with the pipe by the operation of the actuator, the tension of which is relieved to enable retraction of the jaw by movement of the actuator in reverse direction.

19. In a unidirectional pipe manipulating machine of the character described, a main frame, a reciprocatory carriage thereon, a gripper mounted upon the carriage and movable into and out of engagement with the pipe, and actuating means common to the gripper and carriage and having lost motion operative connection terminating in a positive connection with the carriage and yieldable connection with the gripper adapted by its initial movement to operate the gripper into engagement with the pipe independently of movement of the carriage and by further movement to move the carriage and with it the engaged pipe.

20. In a unidirectional pipe manipulating machine, a main frame, a reciprocatory carriage mounted for to and fro motion thereon, a pipe engaging gripper carried by the carriage, motive means for the carriage and an interconnection between the motive means and the carriage having a limited degree of motion terminating in a positive connection, and means intermediate the motive means and the gripper for utilizing said lost motion for engaging the gripper with the pipe in advance of the movement of the carriage.

JOHN G. SCOTT.
FRANK L. FRAIZER.